May 2, 1950     L. L. STOTT     2,505,807
METHOD AND APPARATUS FOR MOLDING POLYAMIDES AND
SIMILAR THERMOPLASTIC MATERIALS
Filed Aug. 4, 1947
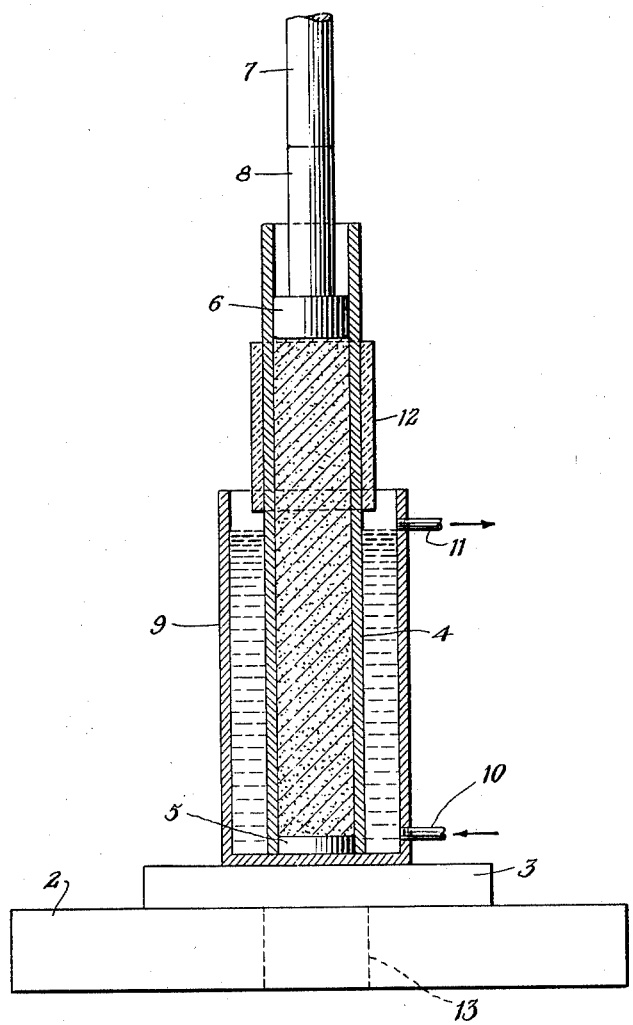
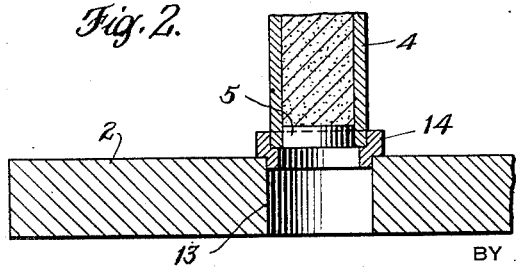
INVENTOR.
Louis L. Stott
ATTORNEYS.

Patented May 2, 1950

2,505,807

UNITED STATES PATENT OFFICE 2,505,807

METHOD AND APPARATUS FOR MOLDING POLYAMIDES AND SIMILAR THERMOPLASTIC MATERIALS

Louis L. Stott, Reading, Pa., assignor to The Polymer Corporation, Reading, Pa., a corporation of Pennsylvania Continuation of application Serial No. 595,325, May 23, 1945. This application August 4, 1947, Serial No. 766,021

10 Claims. (Cl. 18—39)

This invention relates to improved techniques and equipment adapted for use in molding plastics, especially thermoplastic materials such as the synthetic linear condensation polyamides, known in the trade as nylon. Many features of the invention are applicable to quite a wide variety of thermoplastic materials in addition to the polyamides mentioned, for instance, polystyrene and its copolymers, vinylidine chloride, cellulose acetate butyrate, etc., but the invention is particularly useful when applied to that type of thermoplastic materials which are characterized by a high degree of shrinkage upon solidification and by a relatively low viscosity in the molten condition. Typical of materials having the characteristics just mentioned are the synthetic linear condensation polyamides formed as the reaction product of hexamethylenediamine and adipic acid, in which the shrinkage upon solidification amounts to as much as 16% of the material by volume.

Beyond the foregoing the invention is also especially concerned with the molding of elongated pieces such as rods from thermoplastic materials of the character set forth above. High shrinkage of the magnitude mentioned and also low viscosity introduce difficulties from the standpoint of molding technique and of known types of molding equipment. In fact many of the well-known techniques and equipments for forming elongated pieces, such as those heretofore employed in association with thermosetting plastic materials, are entirely unsuited to employment in association with the type of plastics with which the present invention is particularly concerned.

It may be mentioned that high shrinkage and low viscosity of the plastic material prevents the successful employment of conventional extrusion equipment ordinarily readily applied to the formation of rods from plastic materials not having these characteristics to a pronounced degree.

One of the primary objects of the present invention is to provide a method and equipment adapted to the pressure molding of rods or other elongated pieces by application of pressure lengthwise or axially of the piece being molded, rather than crosswise, as was commonly done in accordance with prior practice where thermosetting type of plastics were molded to elongated shapes. The application of pressure axially of elongated pieces is of considerable importance from several standpoints including the fact that molding press equipment of very much smaller size and much less complicated form may be used.

Moreover, according to the invention, the application of pressure axially of the piece being molded enables the employment of a very simple form of mold such as a seamless tube, which is in distinct contrast with the complication encountered where elongated pieces are formed in molds which are axially split and of multi-part concentration.

The present invention provides a method and equipment by which, notwithstanding the application of pressure axially of the pieces being molded, good quality pieces may be made without setting up internal stresses or fractures and without leaving voids in the pieces. Two features of the invention are of importance in this connection, the preferred practice of the invention contemplating employment of both of these features, although either one individually is of value in improving the quality of the molded rods or the like. These two features are considered fully herebelow but at this point it is briefly mentioned that according to one of them the axial pressure on the piece being molded is applied on a decreasing gradient during cooling of the piece, the other feature being the progressive cooling of the piece being molded from one end thereof to the other end thereof.

How the foregoing and other objects and advantages are attained will be brought out more fully following a description of the accompanying drawings, in which—

Figure 1 is a somewhat diagrammatic vertical sectional view through mold equipment constructed according to the present invention; and Figure 2 is a fragmentary vertical sectional view illustrating the preferred method of ejecting a molded piece from the mold.

In the drawing the reference numeral 2 designates a base or bed of a mold press. A plate 3 is supported on the bed 2 and this serves in turn to support the mold tube 4 which, in the illustrative example of the drawing, comprises a seamless steel tube desirably finished to a relatively smooth internal surface of diameter corresponding substantially to that of the piece to be formed. At its lower end the mold tube 4 is closed by a plug 5, the plug desirably being made of a metal having a coefficient of thermal expansion appreciably greater than that of the metal of the tube 4. This feature is of importance, especially when working with plastics of the type which when heated to molding temperature have relatively low viscosity. The plug expands upon heating to tightly engage the inner wall of the mold tube thereby preventing loss of plastic material under the high pressure employed during the molding. In addition, after cooling, the relatively high contraction of the plug enables ready displacement thereof from the tube, thereby facilitating removal of the molded article.

Toward the upper end of the tube another plug 6 is arranged above the charge of plastic material contained in the tube. Hydraulic pressure is adapted to be delivered from the head of the press, for instance through the plunger 7 to the plug 6, through the intermediation of a loose plunger 8. For the purpose of controlling the cooling rate a jacket 9 is desirably provided surrounding the lower part of the tube 4 and provided with an inlet 10 and an outlet 11, such as flexible hose connections, through which a cooling medium may be circulated. Moreover, temperature control may also be secured by employing a jacket 12 or the like, surrounding the upper portion of the tube.

Many variations in details of construction of the mold equipment may be adopted, as will be apparent from the description herebelow of the method of molding.

For the purpose of describing the method, one typical procedure is given in full herebelow. In this illustrative procedure it is assumed that the material being molded is a synthetic linear condensation polyamide having a melting point of about 505° F. and characterized by high shrinkage upon cooling and solidification. It is further assumed that in the illustrative example the rod being molded is about 8" long and about 1⅛" in diameter.

The mold tube 4 is readily inserted in and withdrawn from its position in the press and for convenience in charging the tube it is taken out of the press and charged with a suitable amount of the plastic material in flake, chunk or powder form, in a cold pressed or preformed state, and with the bottom plug 5 in place.

The tube and the charge of plastic material are then heated to the desired molding temperature, for example in the neighborhood of 540° F. Accuracy and speed of heating are of great importance and for this purpose I prefer to employ a heating bath comprising, for example, a low melting metal, or alternatively oil, or a molten salt, or any other liquid heat transfer medium. Desirably, the volume of the bath should be relatively large with relation to the mass of the charged tubes to be immersed, so as to provide a substantial reservoir of heat units which will effect rapid heating. In addition, it is desirable that the bath temperature be as accurately maintained as possible close to but a little above the temperature to which it is desired to heat the plastic.

Upon attaining the desired temperature throughout the mass of the plastic in the tube, the tube is placed in the press and the molding proceeded with in accordance with the description herebelow. At this point, however, it is mentioned that the handling of the mold tubes, including the charging thereof and the heating thereof independently of the press itself is of advantage for a number of reasons. In the first place, the output or capacity of a given press is substantially increased by the separate handling of the mold tubes, since a charge in one tube may be cooling under pressure while another tube is being filled and heated, and the press thereby being retained in substantially constant productive operation. Moreover, as compared with molding equipment in which the mold itself constitutes a more or less detachable part of the press, the equipment of the present invention is very greatly simplified. It will be understood, however, that the improved techniques of the present invention, involving both pressure and temperature gradients axially of the piece during the molding, are applicable to other types of molding equipment.

When a charged and appropriately heated tube is inserted in the press, the press is actuated to apply pressure through the plug 6, an effective initial pressure being in the neighborhood of about 20,000 lbs. per sq. inch. In the illustrative procedure here described, this initial full pressure is maintained for a period of time not greater than about 5 minutes and then the pressure is decreased, either continuously or in decrements over a period of time ranging from about 15 to 30 minutes, during which time cooling is also taking place. At the end of this molding time the applied pressure has advantageously been diminished to zero.

During the molding period the material is cooled from the initial temperature down to a temperature well below the solidification point, and in the preferred practice of the invention the cooling is effected in a manner to cause the temperature of the material in the bottom of the tube to drop more rapidly than the temperature toward the upper end of the tube. In effect, the material in the tube is chilled progressively, beginning at the bottom end and working upwardly to the top.

In the illustrative equipment shown in the drawing, this type of cooling is brought about by the action of both the cooling liquid in the jacket 9 and by the insulating jacket 12, and in addition, by still another factor, i. e., the heat transfer through the bottom plug 5, the bottom wall of the jacket 9, to the plate 3. This last factor accentuates the initiation of cooling at the bottom of the column of material, and in some cases is even sufficient alone to provide the desired temperature gradient. The circulation of cooling liquid in the jacket 9 from the bottom upwardly also serves to maintain a temperature gradient, providing progressively more rapid cooling toward the lower end of the tube. The insulating jacket 12 serves to retard dissipation of heat through the wall of the tube toward its upper end. By the several means just described, the material being molded is progressively chilled from the bottom to the top of the tube.

It will be understood that for cooling purposes various cooling liquids or other media may be circulated through the jacket 9 and further that the temperature of the cooling medium would be different under different conditions, such as the diameter of the piece being molded, the rate of pressure decrease, and the nature of the specific plastic material used. To illustrate, in some cases the cooling liquid may be cold water, i. e., water somewhat below room temperature, whereas in others even substantially heated oil may serve the purpose, depending upon various of the factors already mentioned and especially upon the temperature at which the particular plastic material solidifies. Steam constitutes an appropriate cooling medium for certain purposes, and in this event it will be understood that a closed jacket would be preferred to an open one. Similarly, with respect to jacket 12 it may even be desirable to employ a hollow jacket for this purpose adapted to the circulation of a temperature controlling medium therethrough, or alternatively to use some other heating means, such as an electric heater surrounding the upper portion of the tube. In the event of a molding operation requiring relatively slow cooling, it may even be necessary to add heat to the upper end of the material during the initial stages of cooling, in order to maintain the progressive chilling and solidification of the column of material from the bottom end thereof to the top end thereof.

The preferred practice employed for ejecting the molded piece is illustrated in Figure 2, in which the mold tube 4 is shown as positioned over an aperture 13 in the bed 2 of a press which may either be the same press illustrated in Figure 1 or another similar press. A shouldered ring 14 is provided to center and support the tube 4 over the aperture 13, it being contemplated that rings of different sizes may be employed as adapters, whereby molded rods of various diameters may be handled with a given press mechanism. When the mold tube, with the molded rod therein, is positioned as shown in Figure 2, the press is actuated to eject the molded piece axially downwardly through the aperture 13 in the bed. In the case of pieces molded from polyamides of the type mentioned, the molded piece may readily be displaced from the tube, even without a taper in the tube, although such a taper may be used to advantage with certain other plastics.

As mentioned above, the molding technique and equipment of this invention are particularly suited to plastics manifesting at least appreciable shrinkage upon solidification, or a relatively high rate of thermal contraction during drop in temperature, this factor being of importance in facilitating ejection of the molded piece from the mold tube.

The pressure and temperature gradients, especially when employed in the relationship described above, are of importance in reducing any tendency to cause internal fracture or appreciable internal stress in the material being molded, and in preventing occurrence of voids in the piece.

It should be mentioned that the amount of applied pressure and the rate of drop of pressure will vary considerably with the size of the piece being molded and also with the specific plastic employed. Moreover, while the invention is of particular applicability to the molding of rods or the like, certain features of the invention can be applied to the forming of pieces of some other shapes, for instance, shapes in which it is practicable to employ the pressure and temperature gradients contemplated according to the invention.

With respect to the plastics with which the invention is concerned, it may be mentioned that some of them have no true or sharp melting or solidification point, but soften or solidify rather gradually over a more or less extended temperature range, by which characteristic such plastics are distinguished from polyamides of the type mentioned above. Nevertheless, various of the plastics which soften rather than melt also show appreciable shrinkage during solidification, and the invention is also useful when applied to such materials.

As above mentioned the invention is particularly advantageous in the molding of synthetic linear polyamides. When molding these materials according to the invention, it has been found that striking improvements in physical properties of the molded piece are achieved, notably freedom from voids or porosity and increase in tensile strength as compared with low pressure casting or molding. These improvements are apparently achieved primarily as a result of the employment of the very high molding pressures above referred to, which are applied endwise of the piece. Pressures of the order of 20,000 pounds per square inch are suitable for the purpose, for instance from 10,000 pounds to 40,000 pounds per square inch, although somewhat lower or higher pressures may be used. However, pressures below about 5000 pounds per square inch do not show the sharp increase in tensile strength and moreover produce erratic results in physical properties. On the other hand, pressures above about 50,000 pounds per square inch are not practicable because of equipment limitations and difficulty which is encountered in removing the molded rods from the mold. Moreover, very high pressures are apt to develop excessive strain in the piece.

To illustrate employment of the invention in the molding of rods from a typical polyamide, there is given herebelow a table showing tensile strength of rods molded of polyhexamethylene adipamide. In each example the rod was of 1⅛ inch diameter, and in all cases identical melting and handling conditions were used, except for the pressure applied during cooling.

|   | Molding Pressure, p.s.i. | Tensile Strength, p.s.i. |
|---|---|---|
| 1 | 10,000 | 10,000 |
| 2 | 20,000 | 11,400 |
| 3 | 25,000 | 12,200 |
| 4 | 30,000 | 12,450 |
| 5 | 40,000 | 12,220 |
| 6 | 50,000 | 10,500 |

In the range of molding pressures illustrated just above, I have found that the tensile strength is uniformly above 9000 pounds per square inch, which is exceptional in the field of thermoplastic materials. If the molding pressure is appreciably below 5000 pounds per square inch, the tensile strength drops off sharply and is very erratic, frequently being as much as 4000 to 5000 pounds per square inch lower than the range illustrated in the table above.

The present application is a continuation of my copending application Serial No. 595,325, filed May 23, 1945, now abandoned.

I claim:

1. The method for molding synthetic linear polyamides to elongated shapes which comprises placing a charge of the polyamide in an elongated tubular mold having a closure member at one end, inserting a closure member in the other end of the tubular mold, heating the mold and the polyamide therein to a temperature above the melting point of the polyamide, cooling the mold and the polyamide therein, and applying pressure to the polyamide in the mold by advancing one of said end closure members in an axial direction against the polyamide during cooling, the pressure applied being above 5000 pounds per square inch.

2. A metho according to claim 1 in which the pressure is progressively reduced during cooling.

3. A method according to claim 1 in which the rate of cooling is greater toward one end of the mold than toward the other end thereof.

4. A method according to claim 1 in which the rate of cooling is greater toward the end of the mold remote from that in which the end closure is advanced under pressure than toward the other end of the mold.

5. In the molding of elongated pieces from a synthetic linear polyamide, the method which comprises placing a charge of the polyamide in an elongated mold having a closure member at one end, closing the other end of the mold by inserting a closure member therein, immersing the charged and closed mold in a liquid heating bath to heat the mold and the polyamide therein to a temperature above the melting point of the polyamide, removing the heated mold from the heating bath to permit cooling thereof, and applying pressure to the polyamide axially of the mold by advancing an end closure thereof during cooling, the pressure applied being from 10,000 pounds per square inch to 50,000 pounds per square inch.

6. The method for molding a synthetic linear polyamide in an elongated mold to form an elongated piece, which method comprises heating the polyamide to the molten condition, and while in such elongated mold cooling the molten polyamide below its solidification temperature and concurrently applying pressure endwise of the piece being molded, the pressure applied being above 5000 pounds per square inch.

7. Apparatus for molding plastic material to an elongated shape, comprising a tubular mold, a closure plug for an end of the mold tube, the plug being formed of metal having a higher coefficient of thermal expansion than that of the mold tube and being proportioned to provide for insertion and removal when the plug and tube are at relatively low temperature and for sufficient thermal expansion to provide a liquid tight fit when the plug and tube are at molding temperature, and means for ejecting a molded piece comprising a support for the side wall of the plugged end of the mold tube, the support being provided with an aperture through which the plug and the molded piece may be ejected from the mold tube by applying pressure to the opposite end of the molded piece.

8. In the molding of elongated pieces from a synthetic linear polyamide, the method which comprises applying pressure to a column of molten polyamide in a heated elongated mold, the pressure being applied endwise of the column, and cooling the mold and the molten polyamide therein to effect solidification of the polyamide while under pressure, the pressure applied being above 5000 pounds per square inch during said cooling.

9. A method according to claim 8 in which the pressure is maintained for a few minutes during initial cooling and in which the pressure is progressively reduced during subsequent cooling.

10. A method according to claim 9 in which the cooling and pressure reduction are effected over a period of at least 15 minutes.

LOUIS L. STOTT.

REFERENCES CITED

The following references are of record in the file of this patent:

UNITED STATES PATENTS

| Number | Name | Date |
|---|---|---|
| 2,136,423 | Fields et al. | Nov. 15, 1938 |
| 2,136,425 | Fields | Nov. 15, 1938 |
| 2,244,208 | Miles | June 3, 1941 |
| 2,294,865 | Frankenthal | Sept. 1, 1942 |
| 2,305,362 | Taylor | Dec. 15, 1942 |
| 2,307,371 | Hileman | Jan. 5, 1943 |
| 2,339,211 | Whitehouse | Jan. 11, 1944 |

Certificate of Correction

Patent No. 2,505,807

May 2, 1950

LOUIS L. STOTT

It is hereby certified that errors appear in the printed specification of the above numbered patent requiring correction as follows:

Column 2, lines 9 and 10, for the word "concentration" read *construction*; column 6, line 69, for "metho" read *method*;

and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*